(12) United States Patent
Minh et al.

(10) Patent No.: US 8,378,684 B2
(45) Date of Patent: Feb. 19, 2013

(54) METHOD FOR DETERMINING FLUID TYPE IN RESERVOIR

(75) Inventors: Chanh Cao Minh, Katy, TX (US); Michel Claverie, Le Chesnay (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 413 days.

(21) Appl. No.: 12/423,073

(22) Filed: Apr. 14, 2009

(65) Prior Publication Data

US 2010/0259266 A1    Oct. 14, 2010

(51) Int. Cl.
*G01V 3/10* (2006.01)

(52) U.S. Cl. ............ 324/339; 324/337; 324/338; 702/6; 702/7; 166/250

(58) Field of Classification Search .......... 324/339, 324/333, 337, 338; 702/6, 7; 166/250
See application file for complete search history.

(56) References Cited

U.S. PATENT DOCUMENTS

| | | | | |
|---|---|---|---|---|
| 3,363,692 A | * | 1/1968 | Bishop | 166/306 |
| 3,921,126 A | * | 11/1975 | Waters | 367/40 |
| 3,993,944 A | * | 11/1976 | Meador et al. | 324/341 |
| 5,278,507 A | * | 1/1994 | Bartel et al. | 324/338 |
| 5,550,473 A | * | 8/1996 | Klein | 324/338 |
| 2007/0256832 A1 | * | 11/2007 | Hagiwara et al. | 166/250.16 |
| 2010/0123461 A1 | * | 5/2010 | Folberth et al. | 324/339 |

OTHER PUBLICATIONS

"New Breakthrough Device Finds Untapped Oil Reserves in Old Wells; Company Licenses Technology to Western Atlas, Schlumberger and Atlantic Richfield Company; To Form Partnerships for Low Risk, Low Cost Exploration for Oil and Gas" From Business Wire published Apr. 27, 1995, Pertinent pp. 1-3.*
Article from: Business Wire Article date: Apr. 27, 1995 Palo Alto, Calif.—(Business Wire)—Apr. 27, 1995—PML Inc.*

* cited by examiner

*Primary Examiner* — Huy Q Phan
*Assistant Examiner* — Temilade S Rhodes-Vivour
(74) *Attorney, Agent, or Firm* — Darla P. Fonseca

(57) ABSTRACT

A method for determining a formation type within a wellbore includes forming the wellbore such that the wellbore intersects fractures within a formation. Hydrocarbons are produced from the formation. An induction tool is disposed into the wellbore after producing the hydrocarbons. A resistivity of a portion of the formation is measured with the induction tool. The resistivity of the portion of the formation is compared with a known formation type. The formation type of the portion of the formation is determined based on the resistivity. A characteristic of the formation type is output.

20 Claims, 3 Drawing Sheets

METHOD FOR DETERMINING FLUID TYPE IN RESERVOIR

BACKGROUND OF DISCLOSURE

1. Field of the Disclosure

Embodiments disclosed herein generally relate to methods to determine a fluid type of a fractured formation within a wellbore. More specifically, embodiments disclosed herein relate to methods using an induction tool when determining a formation type within a wellbore.

2. Background Art

Wells are generally drilled into the ground to recover natural deposits of hydrocarbons and other desirable materials trapped in geological formations in the Earth's crust. A well is typically drilled using a drill bit attached to the lower end of a drill string. The well is drilled so that it penetrates the subsurface formations containing the trapped materials and the materials can be recovered.

The drilling operations are controlled by an operator at the surface. The drill string is rotated at a desired rate by a rotary table, or top drive, at the surface, and the operator controls the weight-on-bit and other operating parameters of the drilling process. At the bottom end of the drill string is a "bottom hole assembly" ("BHA"). The BHA includes the drill bit along with sensors, control mechanisms, and the required circuitry. A typical BHA includes sensors that measure various properties of the formation and of the fluid that is contained in the formation, as well as the operating conditions of the drill bit and other downhole equipment.

Another aspect of drilling and well control relates to the drilling fluid, generally called "mud." The mud is a fluid that is pumped from the surface to the drill bit by way of the drill string. The mud may serve to cool and lubricate the drill bit and then carry the drill cuttings back to the surface. The density of the mud is carefully controlled to maintain the hydrostatic pressure in the borehole at desired levels.

After drilling and developing the wellbore, the formation then may be prepared for production. During production, the wellbore may produce both hydrocarbons, such as gas and oil, in addition to water. Generally, the formation and wellbore will continue to be produced for as long as is economically efficient. When the wellbore then is no longer economically efficient, such as when the wellbore is no longer producing hydrocarbons, or is only producing small amounts of hydrocarbons as compared to water, the wellbore may then be abandoned or worked-over.

Workover of a wellbore refers to the repair or stimulation of an existing wellbore for the purposes of restoring, prolonging, or enhancing the production of hydrocarbons from a wellbore. For example, a wellbore may be producing excessive water, thereby preventing the wellbore from being economically efficient. The wellbore may be worked-over to restrict the water production of the wellbore and then continue or stimulate hydrocarbon production. This may be done by sending a measuring tool downhole to determine the various fluid types in the fractures within the wellbore (e.g., a water-filled fracture and a hydrocarbon-filled fracture), in which the fluid type in the fracture may be different from the fluid type within the matrix of a formation.

A fractured formation generally includes two parts: 1) a low porosity, low permeability matrix (i.e., formation), and 2) a network of high permeability fractures, such as naturally occurring or induced fractured reservoirs, that may act as conduits for fluid flow. As is common, the measuring tools used downhole to characterize a fractured formation are usually shallow probing log tools, such as an Oil-Based Micro-Imager ("OBMI") tool or a Formation Micro-Imager ("FMI"). These shallow probing log tools usually can only measure the properties of the formation type with only a few inches (e.g., ~3.5 in or 8.9 cm) for depth-of-investigation ("DOI"). DOI refers to the distance that characterizes how far a tool measures into the formation from the face of the measuring tool or the borehole wall. Because this DOI of the measuring tools is so shallow, and because drilling fluids may be pumped downhole, the measuring tools may not accurately measure the fluid type within the fractures, in addition to determining if the fractures are closed (e.g., healed), partially-closed, or open. Accordingly, there exists a need to more accurately measure the fluid types in the fractures of a fractured formation and to characterize the closure/openness of the fractures to determine if it may be appropriate to produce or workover the wellbore.

SUMMARY OF INVENTION

In one aspect, embodiments disclosed herein relate to a method for determining a fluid type of a fractured formation within a wellbore. The method includes forming the wellbore such that the wellbore intersects naturally-fractured reservoirs within a formation, producing hydrocarbons from the formation, disposing an induction tool into the wellbore after producing the hydrocarbons, and measuring a resistivity of a portion of the formation with the induction tool. The method then further includes comparing the resistivity of the portion of the formation with a known formation type, determining the formation type of the portion of the formation based on the resistivity, and then outputting a characteristic of the formation type.

In another aspect, embodiments disclosed herein relate to a method for determining a fluid type of a fractured formation within a wellbore. The method includes disposing a tri-axial induction tool into the wellbore, measuring a horizontal resistivity measurement and a vertical resistivity measurement of a formation of the wellbore with the tri-axial induction tool, and determining an anisotropy measurement based upon the horizontal resistivity measurement and the vertical resistivity measurement. The method then further includes determining a formation type of the portion of the formation based upon at least one of the horizontal resistivity measurement, vertical resistivity measurement, and anisotropy measurement, and outputting a characteristic of the formation type.

In yet another aspect, embodiments disclosed herein relate to a method for determining a fluid type of a fractured formation within a wellbore. The method includes forming the wellbore such that the wellbore intersects fractures within a formation, disposing a tri-axial induction tool into the wellbore after producing the hydrocarbons, and measuring a horizontal resistivity measurement, a vertical resistivity measurement, and an anisotropy measurement of the formation with the tri-axial induction tool. The method then further includes determining the formation type of a portion of the formation based upon at least one of the horizontal resistivity measurement, the vertical resistivity measurement, and the anisotropy measurement, in which the formation type includes one of a water-based fluid disposed within the formation and disposed within fractures of the formation, a hydrocarbon-based fluid disposed within the formation and disposed within the fractures of the formation, a water-based fluid disposed within the formation and a hydrocarbon-based fluid disposed within the fractures, and a hydrocarbon-based fluid disposed within the formation and a water-based fluid disposed within the fractures. The method then further includes outputting a characteristic of the formation type.

Other aspects and advantages of the invention will be apparent from the following description and the appended claims.

DETAILED DESCRIPTION

Figure 1:
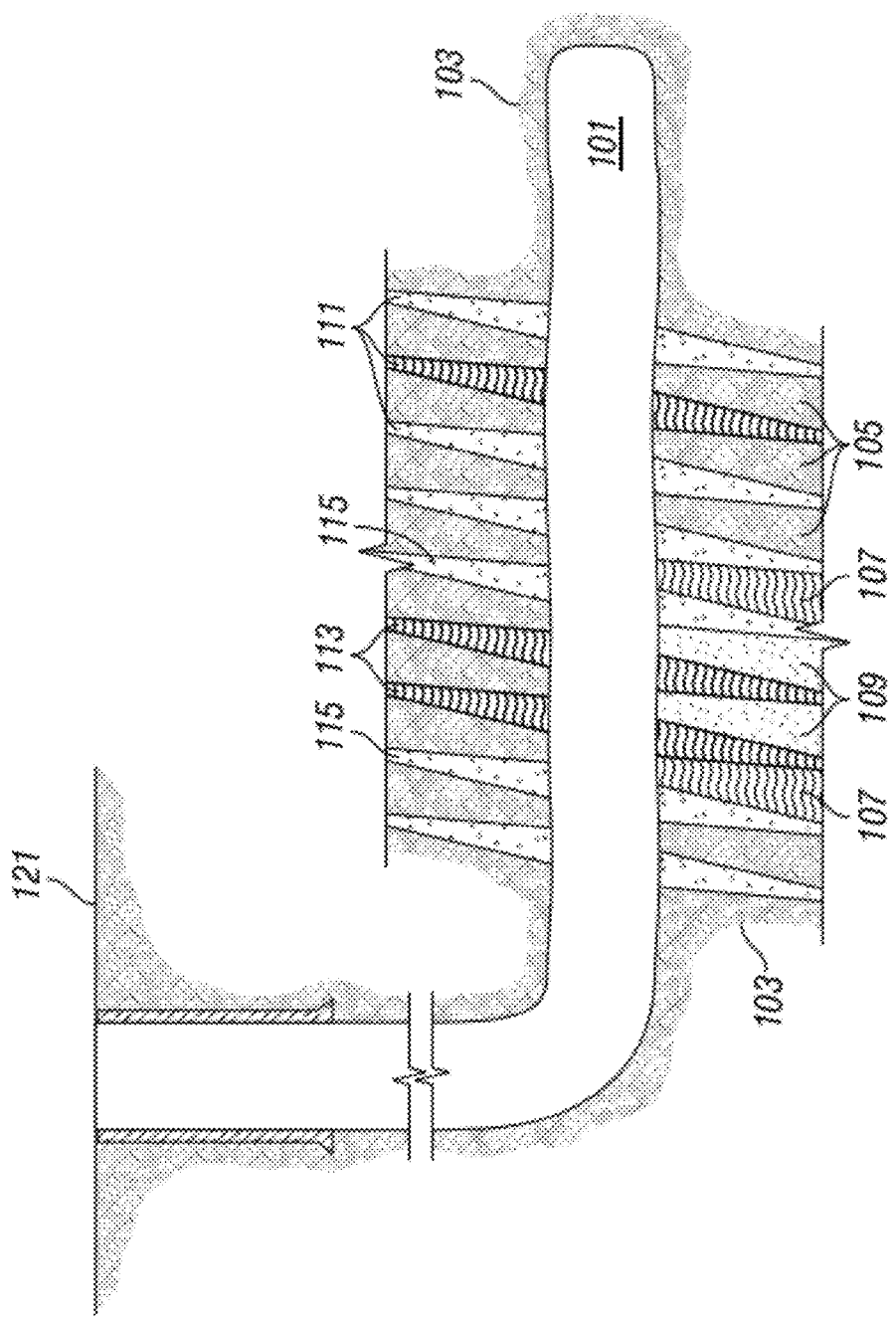
FIG. 1 shows a cross-sectional view of a wellbore in accordance with embodiments disclosed herein.

Specific embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the invention. However, it will be apparent to one of ordinary skill in the art that the embodiments disclosed herein may be practiced without these specific details. In other instances, well-known features have not been described in detail to avoid unnecessarily complicating the description.

In one aspect, embodiments disclosed herein generally relate to a method for determining a formation type within a wellbore. The wellbore may be formed (e.g., drilled) such that the wellbore intersects fractures within a formation. Fractures occurring within a formation may increase the permeability of the formation by connecting pores of the formation together, thereby increasing production of fluids from the formation and wellbore. Hydrocarbons may then be produced from this formation, usually by receiving hydrocarbon-based fluid from the fractures from the formation, or from the formation itself.

After the wellbore has been formed and sufficiently produced, an induction tool may be disposed downhole into the wellbore for measuring. The induction tool, such as a tri-axial induction tool, may take measurements from the formation having several feet of depth-of-investigation. These measurements include a resistivity of the formation based upon horizontal resistivity measurement, a vertical resistivity measurement, and/or an anisotropy measurement. Using any one or all of these measurements then, one may determine a formation type of the formation measured with the induction tool. Based upon this formation type, an operator, engineer, or any other user associated with the wellbore, may determine whether the formation should be further produced, whether the wellbore or formation should be worked-over, whether portions of the wellbore should be isolated, or whether the wellbore should be abandoned.

Referring now to FIG. 1, a cross-sectional view of a wellbore 101 in accordance with embodiments disclosed herein is shown. The wellbore 101 is formed through a surface 121 and within a formation 103, in which the formation 103 has multiple fractures 111 formed therein. As shown, the fractures 111 usually occur within the formation 103 at angle that is substantially vertical with respect to the surface 121 (e.g., earth's crust), or occur within the formation 103 at angle that is substantially more vertical than horizontal with respect to the surface 121. Accordingly, to have the wellbore 101 intersect as many fractures 111 as possible, the wellbore 101 may be formed as a high-angle/horizontal wellbore. A high-angle/horizontal wellbore is a wellbore that is formed substantially horizontal with respect to a surface of the wellbore, or is formed substantially more horizontal than vertical with respect to the surface of the wellbore. However, those having ordinary skill in the art will appreciate that the wellbore may be formed in any direction as is necessary to intersect fractures formed within the formation.

Referring still to FIG. 1, the fractures 111 usually include formation fluids disposed therein, in which the formation fluids usually may be distinguished into two groups: water-based fluid 113 and hydrocarbon-based fluid 115. The fractures 111 having water-based fluid 113 are designated with a darker color, and the fractures 111 having hydrocarbon-based fluid 115 are designated with a lighter color.

The fractures 111 occurring within the formation 103 may be located as closed as about a few millimeters from one another. Portions 105 of the formation 103 in between the fractures 111 may then also include formation fluids disposed therein. As such, the portions 105 of the formation 103 may have water-based fluid 107 or hydrocarbon-based fluid 109 disposed therein. As used herein, "water-based" fluid refers to a fluid that has a majority of water-type fluid disposed therein. Similarly, as used herein, "hydrocarbon-based" fluid refers to a fluid that has a majority of hydrocarbon-type fluid disposed therein.

Accordingly, because of the water-based fluid 107 and hydrocarbon-based fluid 109 that may be disposed within the fractures 111, and because of the water-based fluid 107 and hydrocarbon-based fluid 109 that may be disposed within the formation 103, multiple formation types may exist. As used herein, a "formation type" refers to a type of formation with reference to the formation fluid included within the formation and the fractures of the formation. For example, one formation type includes a water-based fluid disposed within the formation and within the fractures. Another formation type includes a hydrocarbon-based fluid disposed within the formation and within the fractures. Yet another formation type includes a water-based fluid disposed within the formation and a hydrocarbon-based fluid disposed within the fractures. And yet another formation type includes a hydrocarbon-based fluid disposed within the formation and a water-based fluid disposed within the fractures.

Figure 2:
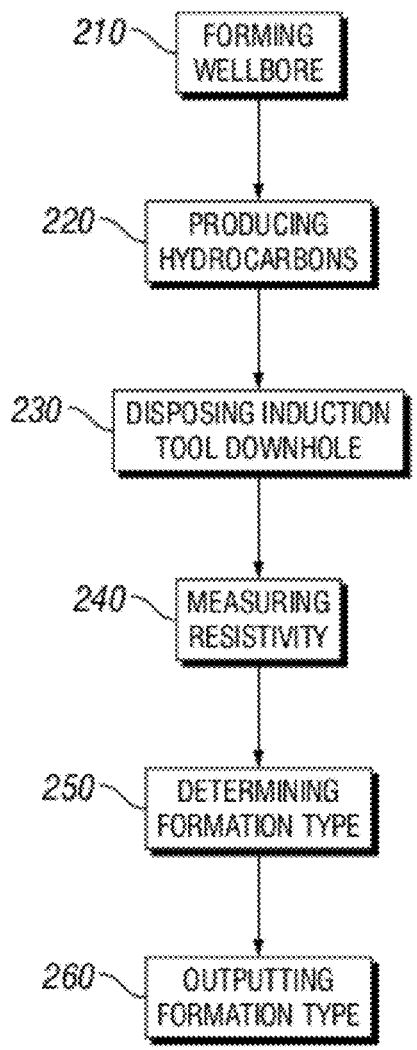
FIG. 2 shows a flow chart of a method in accordance with embodiments disclosed herein.

Referring now to FIG. 2, a flow chart of a method 200 to determine a formation type within a wellbore in accordance with embodiments disclosed herein is shown. The method 200 may include forming a wellbore 210 within a formation and producing hydrocarbons 220 from the wellbore of the formation. As shown above, when the wellbore is formed, the wellbore preferably intersects as many fractures as possible within the formation. This may increase hydrocarbon production efficiency of the wellbore, as the wellbore may then have a denser array of fractures to produce hydrocarbons from. However, those having ordinary skill in the art will appreciate that the wellbore need not be efficient when intersecting fractures, as long as the wellbore intersects at least one fracture within the formation. As such, hydrocarbons are then produced from the fractures that are intersected by the wellbore.

The method 200 further includes disposing an induction tool downhole 230 into the wellbore after producing hydrocarbons 220. When downhole, the induction tool may be used to measure resistivity 230 of the formation, or portion of the formation, in which the measured resistivity may be used to determine a formation type 240. After the formation type is determined using the induction tool, this formation type is output 260 using one or more various techniques. With a user having determined the formation type of the formation present within the wellbore, the user may then decide how to, if at all, further conduct the hydrocarbon production of the wellbore.

Figure 3:
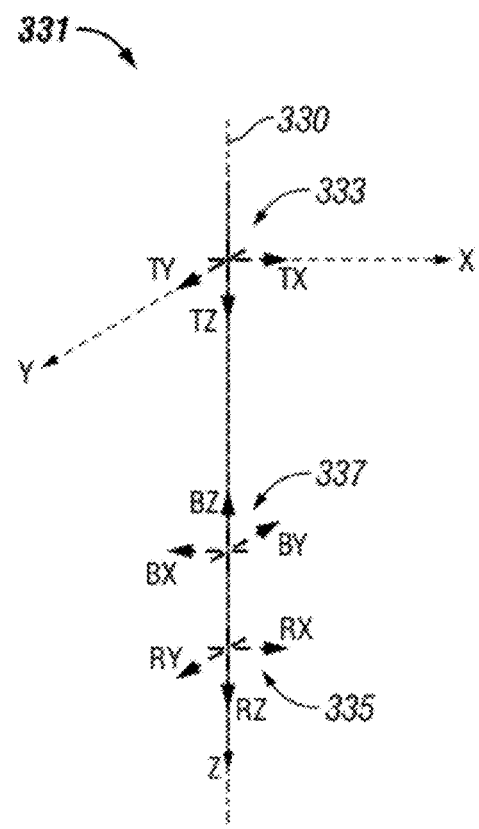
FIG. 3 shows a view of a tri-axial induction tool used in accordance with embodiments disclosed herein.

Referring specifically to steps 230 and 240 of the method 200, when an induction tool is disposed downhole and measures resistivity of the formation, preferably the induction tool is a tri-axial induction tool. As shown in FIG. 3, a tri-axial induction tool 331 having an axis 330 extending therethrough, such as the Rt Scanner triaxial induction tool provided by Schlumberger, may measure resistivity of a formation at different depths-of-investigation in three orthogonal directions (i.e., x, y, and z directions). A transmitter 333 of the induction tool 331 transmits energy, such as electromagnetic energy, into the formation in three orthogonal directions, such as $T_x$, $T_y$, and $T_z$ shown in FIG. 3. Then, using a main receiver 335 and a balancing receiver 337, the effects of the energy transmitted into the formation may be measured and received. Specifically, the main receiver 335 may measure the energy effects within the formation in three orthogonal directions, such as $R_x$, $R_y$, and $R_z$ shown in FIG. 3, and the balancing receiver 337 may measure the energy effects within the formation also in three orthogonal directions, such as $B_x$, $B_y$, and $B_z$ shown in FIG. 3. A tri-axial induction tool may then measure the resistivity of the formation at a range up to about 72 in (183 cm) depth-of-investigation based upon the measured effects received from the formation (discussed more below). Further, this tri-axial induction tool, having this range for depth-of-investigation, may measure multiple depths-of-investigation within the range, such as depths-of-investigation at about 15 in (38 cm), 21 in (53 cm), 27 in (69 cm), 39 in (99 cm), 54 in (137 cm), and/or 72 in (183 cm).

By measuring the magnitudes and directions of the effects of the energy within the formation, the induction tool may measure and determine a resistivity of the formation at different depths-of-investigation. For example, using the tri-axial induction tool of above, the resistivity of the formation may be measured at one or more of the different depths-of-investigation. This resistivity of the formation is dependent upon the different amounts and types of fluids included in the formation and included in the pores (e.g., reservoirs) of the formation. Thus, different formation types (those described above) usually have different resistivities.

Referring specifically to step 240 now, when the induction tool the measures resistivity of the formation, the tool may measure resistivity in two directions. Specifically, the induction tool may measure and determine a horizontal resistivity measurement $R_H$ and a vertical resistivity measurement $R_V$ of the formation. The horizontal resistivity measurement is the electrical property of resistivity of the formation in the horizontal direction with respect to the axis of the induction tool. The vertical resistivity measurement then is the electrical property of resistivity of the formation in the vertical direction with respect to the axis of the induction tool. Because of the various formation types then, the relationship between the horizontal and vertical resistivity measurements may be calculated to further determine and distinguish the various formation types from one another. The relationship between the horizontal and vertical resistivity measurements is referred to as an anisotropy measurement A and may be determined as follows:

$$A = \frac{R_V}{R_H}$$ Equation 1

As such, the anisotropy measurement of the formation determines the directional dependency of the resistivity within the formation. For example, in a formation type having fractures formed therein, the resistivity of the formation may be different in each direction of the formation because of the presence of the fractures. Thus, the anisotropy measurement may be useful when determining the different formation types.

Referring now to step 250, after measuring and determining the resistivity of the formation 240, the formation type may then be determined based upon the horizontal resistivity measurement, the vertical resistivity measurement, and/or the anisotropy measurement. For water-based fluid, the resistivity of the fluid will usually be relatively low. For hydrocarbon-based fluid, the resistivity of the fluid will usually be relatively high. Further, depending on the type of fluid present within a formation and the type of fluid present within a fractures, the anisotropy will vary accordingly. Table 1 presented below shows the different formation types, as described above, with respective quantitative measurements of horizontal resistivity, vertical resistivity, and anisotropy.

TABLE 1

| Formation Types | $R_H$ | $R_V$ | A |
|---|---|---|---|
| Water-Based Fluid in Formation and Water-Based Fluid in Fracture | Low | Low | Low |
| Hydrocarbon-Based Fluid in Formation and Hydrocarbon-Based Fluid in Fracture | High | High | Low |
| Water-Based Fluid in Formation and Hydrocarbon-Based Fluid in Fracture | Low | High | High |
| Hydrocarbon-Based Fluid in Formation and Water-Based Fluid in Fracture | Low | Med | Med |

As shown above, because of the different resistivities and characteristics of different formation types, the formation type may be determined using the horizontal resistivity, vertical resistivity, and anisotropy measurements. Specifically, as shown above, by having both relatively low horizontal and vertical resistivity measurements, the formation type most likely includes a water-based fluid disposed within the formation and within the fractures. If both the horizontal and vertical resistivity measurements are relatively high then, the formation type most likely includes a hydrocarbon-based fluid disposed within the formation and within the fractures. Also, because the horizontal and vertical resistivity measurements are similar with respect to one another in these two different formation types (e.g., both are relatively high or both are relatively low), the anisotropy measurement will also be relatively low.

Further, assuming that the horizontal and vertical resistivity measurements are not similar to one another, the anisotropy measurement may then be used to determine the formation type. Specifically, if the anisotropy measurement is relatively high, the formation type most likely includes a water-based fluid disposed within the formation and a hydrocarbon-based fluid disposed within the fractures. Otherwise, if the anisotropy measurement is within a selected range between the relatively high and relatively low anisotropy measurements of the other formation types, such as by having a medium anisotropy measurement between the high anisotropy measurement and the low anisotropy measurement, the formation type most like includes a hydrocarbon-based fluid disposed within the formation and a water-based fluid disposed within the fractures. As shown, these formation types may be determined based upon the anisotropy measurements.

After determining the formation type with the induction tool, the method 200 further includes outputting the formation type 260, such as outputting a characteristic of the formation type. A characteristic of the formation type may include one or more of the measurements of the formation type (e.g., horizontal resistivity, vertical resistivity, and anisotropy measurements), may include the names or identifier of the formation type, or may include any other characteristic of the formation type known in the art, such as density, pressure, and/or temperature, that may be used to identify the formation type determined from the induction tool.

Figure 4:
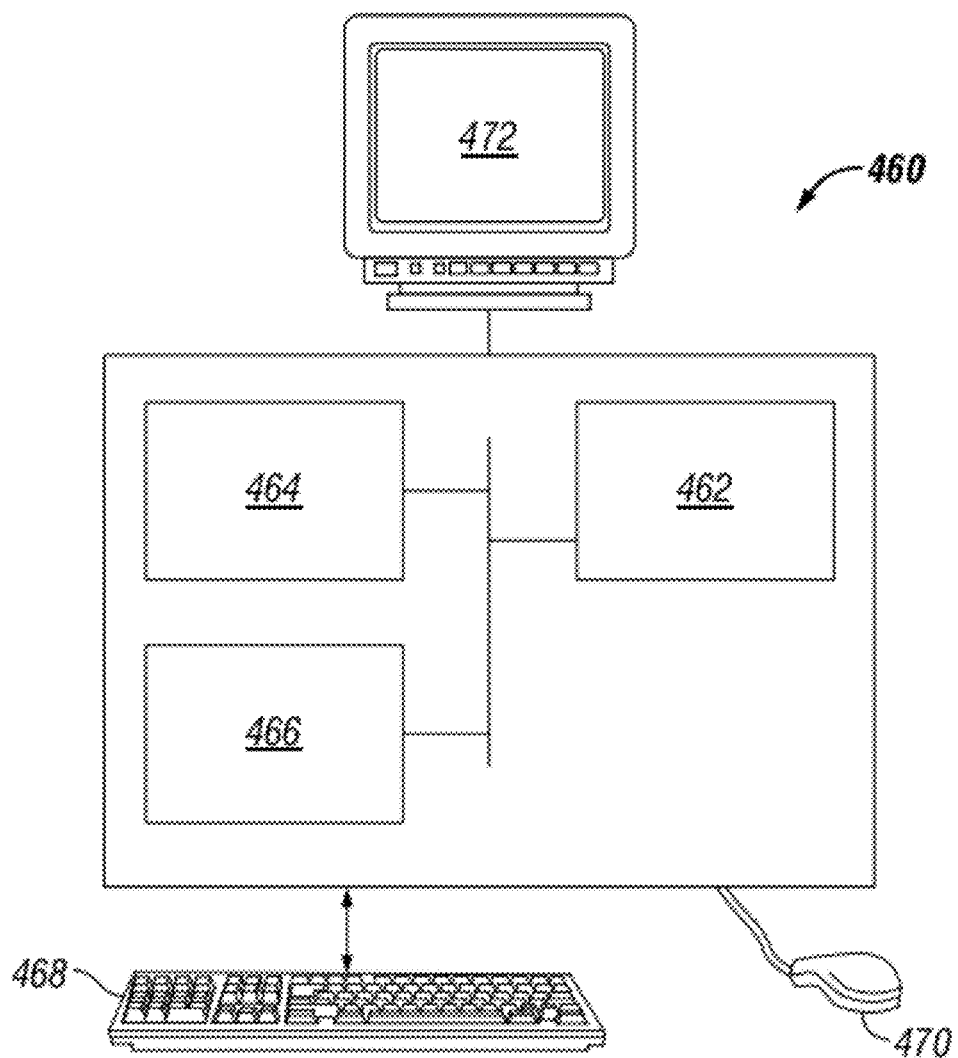
FIG. 4 shows a view of a computer system used in accordance with embodiments disclosed herein.

Further, when outputting the formation type 260, the method 200 may include one or more of various techniques to output the formation type. For example, aspects of embodiments disclosed herein, such as outputting the formation type, may be implement on any type of computer, regardless of the platform used. As shown in FIG. 4, a computer system 460 that may be used in accordance with an embodiment disclosed herein includes a processor 462, associated memory 464, a storage device 466, and numerous other elements and functionalities typical of today's computers (not shown). Computer system 460 may also include input means, such as a keyboard 468 and a mouse 470, and output means, such as a monitor 472 and/or a printer (not shown). Computer system 460 may then be connected to a local area network (LAN) or a wide area network (e.g., the Internet) (not shown) via a network interface connection (not shown). Those skilled in the art will appreciate that these input and output means may take many other forms also. Further, those skilled in the art will appreciate that one or more elements of aforementioned computer 460 may be located at a remote location and connected to the other elements over a network.

As such, using the computer system 460, the formation type may be output by graphically displaying the formation type or a characteristic thereof, such as by using the monitor 472 of the computer system 460. Further, the formation type may be output by printing the formation type or a characteristic thereof, such as by using a printer connected to the computer system 460. Furthermore, the formation type may be output by storing or transferring to a computer readable media the formation type or a characteristic thereof, such as by storing the formation type on the storage device 466 of the computer system 460. Accordingly, many aspects of a computer system may be used to output the formation type; those having ordinary skill in the art will also appreciate that other means may be used to output the formation type without departing from the scope of the present disclosure.

With a user having determined the formation type of the formation present within the wellbore, the user may then decide how to, if at all, further conduct the hydrocarbon production of the wellbore. For example, assuming the well had been producing hydrocarbons from the wellbore, but now the wellbore had been overcome by the production of water, the user may determine the formation type using the method or a variation of the method presented above. Based upon the formation type that the user determines is within the formation being drilled, the user then may make a decision to either continue producing the wellbore, working-over the wellbore, or possibly abandoning the wellbore. Specifically, by determining the formation type, the user may decide to workover the wellbore, such as by isolating a portion of the formation because this portion type only produces water-based fluid, or produces only minimal hydrocarbon-based fluid with respect to the water-based fluid. By isolating this portion of the formation, the wellbore may become may efficient and produce more hydrocarbons because the presence of water within the formation has been reduced. Otherwise, if the user determines that too much water-based fluid is present within the wellbore, the user may decide to abandon the wellbore because the wellbore would not be economically efficient.

Accordingly, embodiments disclosed herein may provide for one or more of the following advantages. First, embodiments disclosed herein may be used to determine the formation type present within a wellbore. For example, as discussed above, by using an induction tool, the resistivities of a formation may be measured to determine the formation type. Next, embodiments disclosed herein may be used to have a more accurate determination of the formation type within a wellbore. For example, by using a tri-axial induction tool, a higher depth-of-penetration may be used to determine the resistivity of a formation. This may give a more accurate representation of the formation type, as compared to a lower depth-of-penetration, because the formation measurements taken further away from the wellbore may be less affected by the processes and procedures used when forming the wellbore. Finally, embodiments disclosed herein may provide for an economically efficient determination of how to conduct the production of a wellbore. For example, based upon the formation type determined, a user may decide whether to continue production of the wellbore, or the user may decide to abandon production of the wellbore.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A method for determining a formation type within a wellbore, the method comprising:
    forming the wellbore such that the wellbore intersects fractures within a formation;
    producing hydrocarbons from the formation;
    disposing a triaxial induction tool into the wellbore after producing the hydrocarbons, the tool inserted therein into a portion of the wellbore having no conductive casing;
    measuring a horizontal and vertical resistivity or a resistivity anisotropy of a portion of the formation with the induction tool using a time-independent induction measurement technique;
    comparing the horizontal and vertical resistivity or the resistivity anisotropy of the portion of the formation with a known formation type;
    determining the formation type of the portion of the formation based on the horizontal and vertical resistivity or the resistivity anisotropy; and
    outputting a characteristic of the formation type.

2. The method of claim 1, wherein the resistivity is based on a horizontal resistivity measurement and a vertical resistivity measurement of the portion of the formation.

3. The method of claim 2, further comprising:
    determining an anisotropy measurement based upon the horizontal resistivity measurement and the vertical resistivity measurement.

4. The method of claim 3, further comprising:
    comparing at least one of the horizontal resistivity measurement, vertical resistivity measurement, and anisotropy measurement with at least one of a horizontal resistivity measurement, vertical resistivity measurement, and anisotropy measurement of a known formation type.

5. The method of claim 4, wherein the known formation comprises at least one of a hydrocarbon-based fluid and a water-based fluid.

6. The method of claim 3, wherein the formation type comprises:
a water-based fluid disposed within the formation and disposed within fractures of the formation, if the horizontal resistivity measurement is lower than a selected horizontal resistivity and the vertical resistivity measurement is lower than a selected vertical resistivity; and
a hydrocarbon-based fluid disposed within the formation and disposed within the fractures of the formation, if the horizontal resistivity measurement is higher than the selected horizontal resistivity and the vertical resistivity measurement is higher than the selected vertical resistivity.

7. The method of claim 6, wherein the fluid type further comprises:
a water-based fluid disposed within the formation and a hydrocarbon-based fluid disposed within the fractures, if the anisotropy measurement is higher than a selected anisotropy; and
a hydrocarbon-based fluid disposed within the formation and a water-based fluid disposed within the fractures, if the anisotropy measurement is lower than a selected anisotropy.

8. The method of claim 1, wherein the induction tool is a tri-axial induction tool.

9. The method of claim 8, wherein the tri-axial induction tool measures dip data of the formation at a range up to about 72 in (183 cm) depth-of-investigation.

10. The method of claim 9, wherein the tri-axial induction tool measures dip data of the formation at multiple depths-of-investigation.

11. The method of claim 10, wherein the multiple depths-of-investigation comprise at least one of a 15 in (38 cm), 21 in (53 cm), 27 in (69 cm), 39 in (99 cm), 54 in (137 cm), and 72 in (183 cm) depth-of-investigation.

12. The method of claim 1, further comprising:
isolating the portion of the formation based upon the formation type; and
reproducing hydrocarbons from the formation.

13. The method of claim 1, further comprising:
abandoning the portion of the formation based upon the formation type.

14. The method of claim 1, wherein the outputting comprises at least one of:
graphically displaying the characteristic of the formation type;
printing the characteristic of the formation type; and
storing or transferring to computer readable media the characteristic of the formation type.

15. A method for determining a formation type within a wellbore, the method comprising:
disposing a tri-axial induction tool into the wellbore;
measuring a horizontal resistivity measurement and a vertical resistivity measurement of a formation of the wellbore with the tri-axial induction tool, the measuring performed using a time independent induction measurement technique;
determining an anisotropy measurement based upon the horizontal resistivity measurement and the vertical resistivity measurement;
determining a formation type of the portion of the formation based upon at least one of the horizontal resistivity measurement, vertical resistivity measurement, and anisotropy measurement; and
outputting a characteristic of the formation type.

16. The method of claim 15, wherein the formation type comprises:
a water-based fluid disposed within a formation and a hydrocarbon-based fluid disposed within fractures, if the anisotropy measurement is higher than a selected anisotropy range; and
a hydrocarbon-based fluid disposed within the formation and a water-based fluid disposed within the fractures, if the anisotropy measurement is within the selected anisotropy range.

17. The method of claim 16, wherein if the anisotropy measurement is lower than the selected anisotropy range, the formation type further comprises:
a water-based fluid disposed within the formation and disposed within the fractures of the formation, if the horizontal resistivity measurement is lower than a selected horizontal resistivity and the vertical resistivity measurement is lower than a selected vertical resistivity; and
a hydrocarbon-based fluid disposed within the formation and disposed within the fractures of the formation, if the horizontal resistivity measurement is higher than the selected horizontal resistivity and the vertical resistivity measurement is higher than the selected vertical resistivity.

18. The method of claim 15, further comprising:
forming the wellbore such that the wellbore intersects fractures within the formation;
producing hydrocarbons from the formation; and
disposing the tri-axial induction tool into the wellbore after producing the hydrocarbons.

19. A method for determining a formation type within a wellbore, the method comprising:
forming the wellbore such that the wellbore intersects fractures within a formation;
disposing a tri-axial induction tool into the wellbore after producing the hydrocarbons;
measuring a horizontal resistivity measurement, a vertical resistivity measurement, and an anisotropy measurement of the formation with the tri-axial induction tool, the resistivity measurements made using a time-independent induction measuring technique;
determining the formation type of a portion of the formation based upon at least one of the horizontal resistivity measurement, the vertical resistivity measurement, and the anisotropy measurement, wherein the formation type comprises one of:
a water-based fluid disposed within the formation and disposed within fractures of the formation;
a hydrocarbon-based fluid disposed within the formation and disposed within the fractures of the formation;
a water-based fluid disposed within the formation and a hydrocarbon-based fluid disposed within the fractures; and
a hydrocarbon-based fluid disposed within the formation and a water-based fluid disposed within the fractures;
outputting a characteristic of the formation type.

20. The method of claim 19, further comprising one of:
producing hydrocarbons from the formation;
isolating the portion of the formation based upon the formation type and reproducing hydrocarbons from the formation; and
abandoning the portion of the formation based upon the formation type.

* * * * *